United States Patent [19]

Evans

[11] Patent Number: 4,660,268
[45] Date of Patent: Apr. 28, 1987

[54] ROLLING MILL ROLL ASSEMBLY
[75] Inventor: Donald R. Evans, Pittsburgh, Pa.
[73] Assignee: Kennametal, Inc., Latrobe, Pa.
[21] Appl. No.: 209,866
[22] Filed: Nov. 24, 1980
[51] Int. Cl.[4] .............................................. B21B 27/02
[52] U.S. Cl. ........................................ 29/523; 29/123; 29/129
[58] Field of Search ................. 29/123, 125, 129, 130; 403/370, 371

[56] References Cited

U.S. PATENT DOCUMENTS 3,514,136  5/1970  Kennicott ........................ 403/370 X
3,514,137  5/1970  Brown et al. ........................ 403/370
4,304,502 12/1981  Stratienko ........................ 403/371 X
4,338,036  7/1982  De Leu ............................ 403/371 X Primary Examiner—Eugene F. Desmond
Attorney, Agent, or Firm—John J. Prizzi

[57] ABSTRACT

A rolling mill roll assembly having a cemented carbide work roll mounted on a tapered rolling mill arbor is described. The roll is held nonrotational with respect to the arbor by a split metallic ring member which is forced into pressurized abutment with the bore of the carbide roll by a cylindrical wedge member interposed between the split ring and the arbor.

8 Claims, 4 Drawing Figures

ROLLING MILL ROLL ASSEMBLY

BACKGROUND OF THE INVENTION

The present invention pertains to forming rolls and to the connection of such forming rolls to supporting arbors. It especially pertains to rolls for rod rolling and their mounting on cantilever type tapered rolling mill arbors.

Rod rolling mills consist of a frame supporting a pair of driven arbors on which are mounted rolls. Each roll has a working surface in which one or more contoured grooves have been placed. The material being worked is passed through the gap formed by the grooves in a pair of rolls and thereby obtains the desired cross sectional configuration and/or reduction in size.

The conditions at the roll work surface can be very abrasive. Cemented carbide rolls, because of their high wear resistance, have, therefore, replaced steel rolls in many rod rolling applications. The high pressures produced when rolling rod also favor the use of cemented carbide because of its high compressive strength.

However, cemented carbide forming rolls present mounting problems, in that the rolls are preferably mounted without a substantial amount of tensile stress being developed therein. One mounting mode preloads the rolls in compression, at least in a direction parallel to their axis of rotation.

Examples of such roll mounting arrangements are shown in U.S. Pat. No. 3,786,546, assigned to applicant corporation; in applicant corporation's brochure entitled "Designing with Kennametal;" U.S. Pat. No. 2,342,159 and British Patent Specification No. 1,420,693. In these arrangements, the majority of the torque from the driven arbor is transmitted to the roll through cylindrical metallic rings attached to the arbor and clamped against both axial faces of the roll.

The problem associated with this mounting arrangement is that the bore of the carbide roll and the mating surface on the arbor should be machined to very tight tolerances in order to assure that the carbide roll will be radially supported all around the circumference of its bore by the arbor. Failure to achieve this desired fit may lead to early roll failure.

In an alternative mounting arrangement, a tapered cylindrical wedge member or sleeve is pressed in between the tapered arbor and the carbide roll bore with sufficient force such that the static frictional forces between the arbor, wedge and roll are sufficient to transmit the torque from the arbor. Examples of this mounting arrangement are described in *Iron and Steel Engineer*, April 1975, Pages 80 to 88. This mounting arrangement, however, produces tensile stresses in the carbide roll near its bore. In order to assure that these tensie stresses will not lead to a failure of the roll, these rolls are designed with increased wall thickness, increased width, or increased width with a keyway to assist in transmitting torque loads.

Keyways in cemented carbide rolls are undesirable since they act as stress raisers. Increasing the width or wall thickness of the roll is also undesirable since it increases the amount of cemented carbide used, thereby increasing the cost of the roll. The metals used in these rolls, for example, Co, W, Ti and Ta, are typically very expensive and of limited availability. Raw material costs, therefore, make up a significant portion of roll manufacturing costs.

In an alternate embodiment of the mounting system just described, the cylindrical wedge member is slotted. This reduces the tensile forces in the carbide roll but does not provide sufficient frictional force to hold the roll nonrotational on the arbor. Keyways are formed in these rolls and they are keyed to the arbor to assure adequate torque transmission. However, as already noted. keyways act as stress concentrators and can, therefore lead to early roll failure. They also increase the cost of the roll, since it is required that the cemented carbide roll have an increased width to accommodate the keyway. Mounting systems utilizing these concepts are illustrated in U.S. Pat. Nos. 3,514,136; 3,514,137; and 3,727,957; all assigned to applicant corporation.

BRIEF SUMMARY OF THE INVENTION

According to the present invention, a rolling mill roll assembly is provided having a cemented carbide roll with a working surface and an internal bore. This roll is mounted on a tapered arbor. The means for mounting comprises a hollow cylindrical wedge having a tapered wall thickness, and a split ring member having an external circumferential surface and a split running the length of the ring.

The external circumferential surface of the ring is forced into pressurized abutment with the bore of the roll when it is expanded by the hollow cylindrical wedge which is forced between the internal circumferential surface of the split ring and the tapered arbor. Suitable means are provided for maintaining the axial position of the roll, split ring and wedge.

The present invention results in the roll being radially supported and held nonrotational on the driven arbor through the pressurized abutment between the split ring and roll. Keying of the roll, or axial clamping of the roll to the arbor, is not required to assure adequate transmission of torque from the arbor to the roll. The utilization of the split ring as described results in a reduction in the mounting pressure required to drive the wedge onto the tapered arbor. This results in reduced tensile stresses in the carbide roll thereby allowing carbide rolls of reduced wall thickness to be designed for use with the cylindrical wedge. This reduces the amount of carbide in each roll and, therefore, the cost of each roll.

According to the present invention, a rod roll is provided having a hollow, generally cylindrical body of cemented carbide. This roll has an outside diameter and inside diameter, with the ratio of inside to outside diameter being in the range of sixty-two (62%) percent to seventy-two (72%) percent. Preferably, the ratio of inside to outside diameter is approximately sixty-five (65%) percent. The roll according to the present invention may have one or more grooves on its work surface, or no grooves at all, depending upon the requirements of the application.

According to the present invention, the split ring member is located concentrically within said roll body. The split ring is dimensioned so as to be in sliding engagement with the internal bore of the roll when the split ring is relaxed.

According to the present invention, the split ring member is provided with a hollow, generally cylindrical and expansible metallic body. The internal diameter of the split ring is dimensioned so as to engage the hollow wedge means, when the wedge is forced over the tapered arbor, and expand so that the outside diameter of the spit ring produces an interference fit with the roll body bore.

The present invention also provides a method for mounting cemented carbide rolls with reduced wall thickness on a rolling mill arbor through the use of a split ring member between the roll body and the arbor. Preferably, mounting is accomplished by interposing the split ring member between the roll and a wedging member mounted concentrically on an arbor.

BRIEF DESCRIPTION OF THE DRAWINGS

The exact nature of the present invention will become more apparent upon reference to the following detailed specification taken in connection with the accompanying drawings in which.

DETAILED DESCRIPTION OF THE INVENTION

Figure 1:
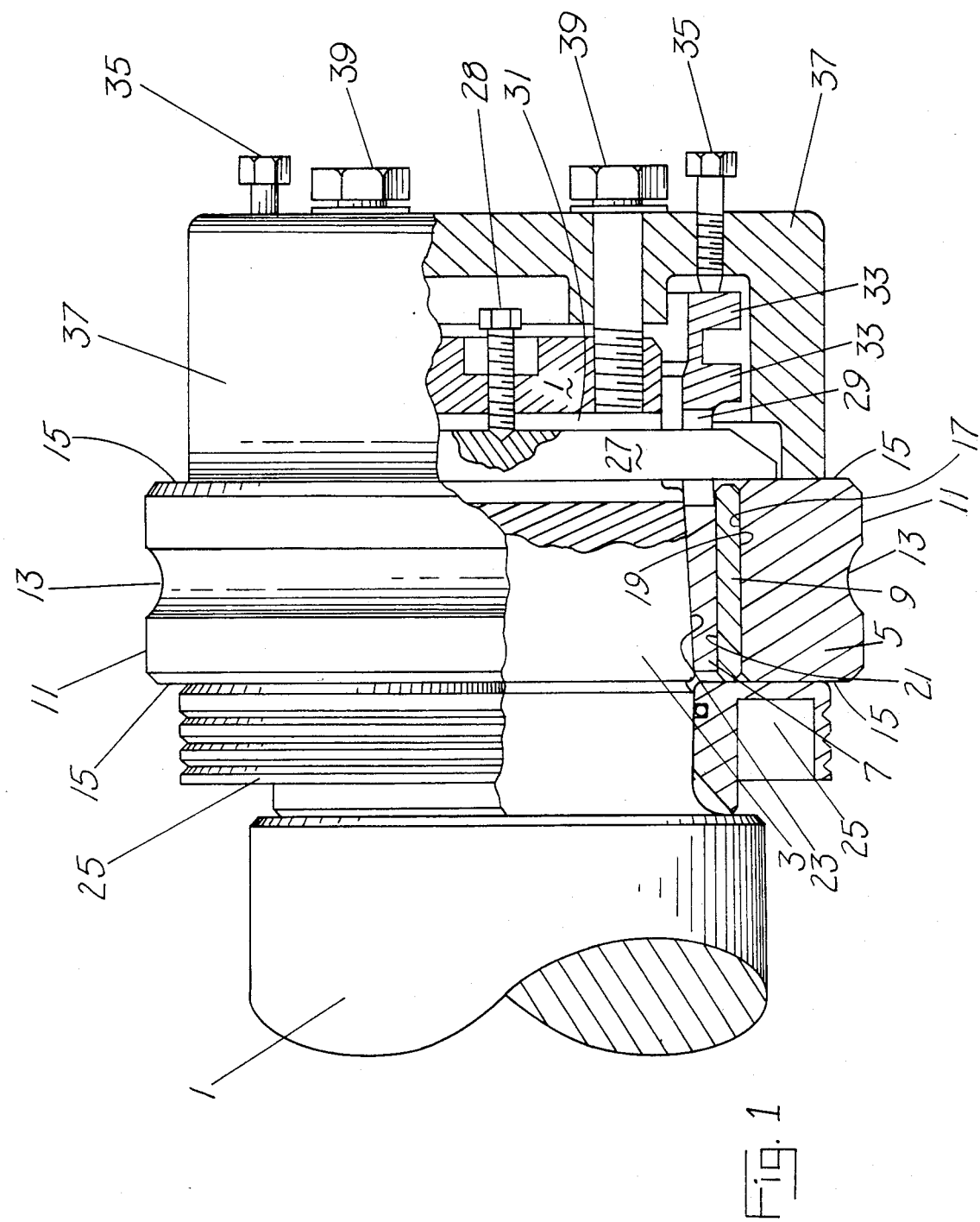
FIG. 1 shows a fragmentary view of a rolling mill roll assembly according to the present invention.

Referring to the drawings somewhat more in detail, FIG. 1 shows a rolling mill roll assembly according to the present invention. An arbor 1 having a tapered diameter section 3 has a cemented carbide roll 5 mounted on the tapered section 3. Mounting of the roll 5 on the tapered section 3 is achieved through the use of a cylindrical wedge member 7 and a split ring member 9.

As shown in FIG. 1, the cemented carbide roll has an outer working surface 11 which has a groove 13 in it. The groove 13 is used for forming rod material. There may be more than one groove 13. Adjacent and perpendicular to the working surface 11 are axially facing roll end faces 15 which extend inwardly of the working surface 11 and join an internal bore surface 17. The internal bore surface 17 is in pressurized abutment with an external circumferential surface 19 of a split ring member 9.

The split ring member 9 is forced into pressurized abutment with the internal bore 17 by a wedge member 7 which has been forced in between the internal circumferential surface 21 of the split ring member 9 and the surface 23 of the tapered arbor 3. This assembly is sufficient to keep the cemented carbide roll 5 substantially nonrotational with respect to the tapered arbor 3 under the forces that are encountered during rolling of rod material.

The roll 5, the split ring member 9 are positioned axially on the arbor 1 by a stop 25 located on the larger diameter side of the tapered arbor section 3 on one side of the roll 5. On the opposite axial roll end face 15 is located a key member 27 which is held in abutment against the axial roll end face 15 of the roll 5 by a key holding bolt 28 which is threadedly joined to the end of the arbor 1 and is abutting the center of the key 27. The key member extends through the diameter of the arbor 1 and the wedge 7. In order to accomplish this, the cylindrical wedge 7 has diametrically opposed keyways 29 and there is a keyway 31 which passes through the diameter of the arbor 1. It should be noted that there are no keyways in the cemented carbide roll 5, itself.

The wedge means 7 is driven into position between the split ring member 9 and the tapered arbor 3 by a predetermined hydraulic force which has been applied to the lug members 33 of the cylindrical wedge 7.

In this way, a predetermined stress or pressurized abutment is formed between the cemented carbide roll 5, split ring member 9, wedge 7 and tapered arbor 3. The wedge member 7, after being driven into position between the split ring 9 and the arbor 3, is maintained in position by wedge bolts 35 which abut the outwardly facing end of the cylindrical wedge 7. These wedge bolts are threadedly connected to an end cap 37 which is engaged by end cap bolts 39 to the end of the arbor 1.

Figure 2:
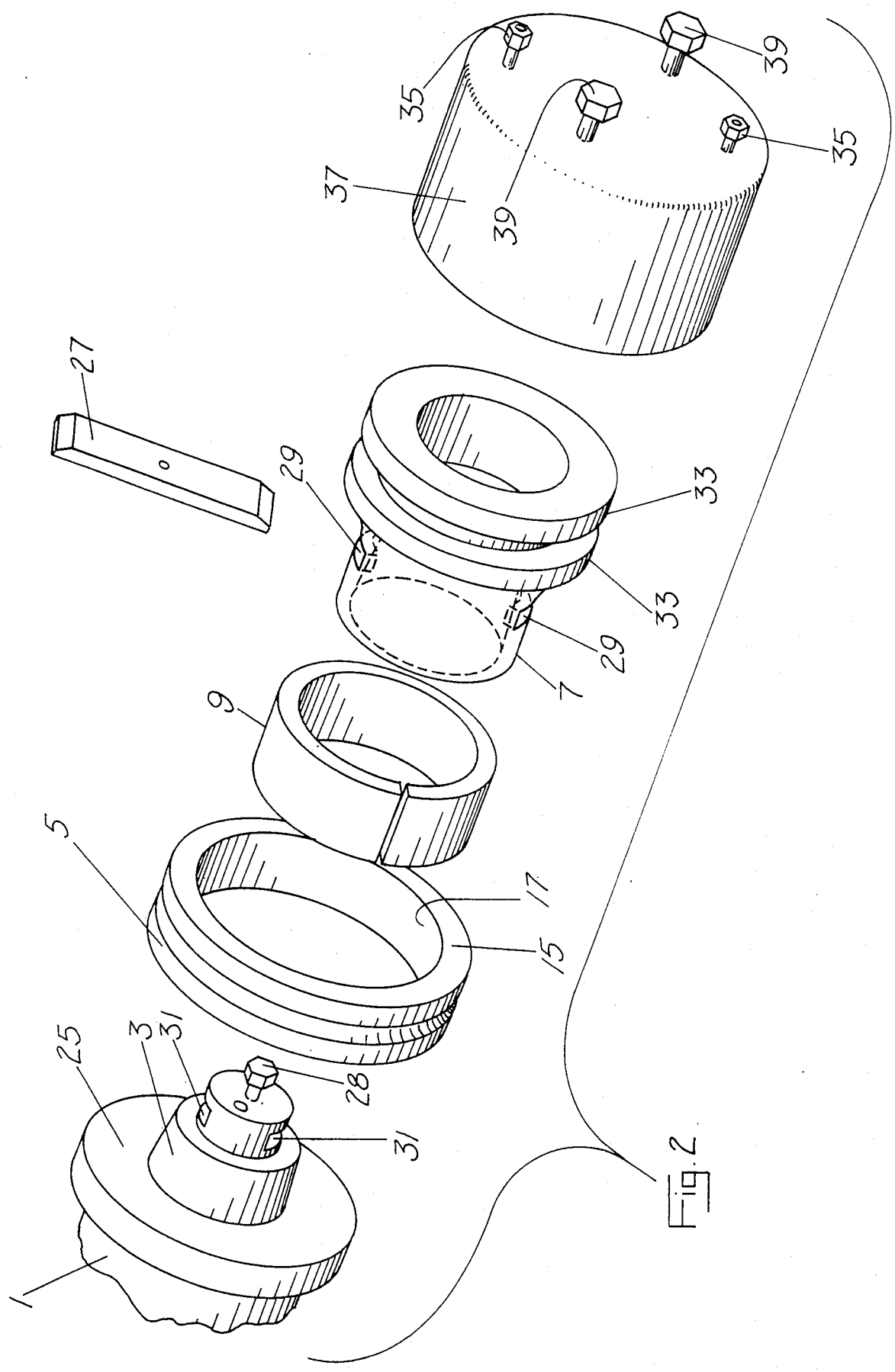
FIG. 2 is an exploded view of the rolling mill roll assembly shown in FIG. 1.

Referring now to FIG. 2, which is an exploded view of the roll assembly shown in FIG. 1, it can be seen that the method of mounting the roll on the tapered arbor 3 according to this invention is as follows:

First, the cemented carbide roll 5 having a split ring member 9 slidably engaged with the internal bore surface 17 of the roll 5 is loosely mounted on the wedge member 7. This assembly of roll 5, split ring 9 and wedge 7 is then slid onto the tapered portion 3 of the arbor 1.

At this point, key 27 is placed through the wedge keyways 29 and arbor keyway 31 and abutted against the axially facing roll end face 15 so as to position the roll 5 and split ring 9 axially on the tapered arbor 3 so that the roll 5 is abutted against stop 25. The key holding bolt 28 holds the key 27 against face 15. The wedge member 7 is now connected to a hydraulic means at its lug end 33 and a predetermined amount of pressure is used to force the wedge member 7 onto the tapered arbor section 3. During this step, the tapered end of the wedge member 7 is expanded by the tapered arbor 3 and, in turn, expands the split ring 9 such that it is now in pressurized abutment with the internal bore 17 of the roll 5.

At this point, the end cap 37 is bolted onto the end of the arbor 1 by end cap bolts 39 after which the wedge bolts 35, which are threadedly engaged to the end cap 37, are abutted against the end of the wedge member 7, thereby assuring that the wedge does not slip out of position during rolling operations.

It should be understood that the mounting syste described with respect to how the roll is held axially on the arbor is not the only way that this can be done, and this invention may include any of the axially holding means that are now known in the art and those that are within the skill of those skilled in the art.

In the roll assembly and method of mounting the roll assembly according to this invention, the split ring member 9 serves to reduce the required mounting pressure that need be applied to mount the roll 5.

In prior art devices, the cylindrical wedge 7 was forced in between a tapered arbor section and the internal bore of a roll such that the tapered section of the wedge was in direct contact with both the internal bore of the roll and the surface of the tapered arbor.

Under the present invention, the mounting forces are reduced since the split ring member 9 is not as stiff as the cemented carbide roll is, therefore, making it easier for the cylindrical wedge member 7 to be expanded over the tapered roll surface. This, in turn, means that the tensile hoop stresses developed in the cemented carbide roll 5 near its internal bore surface are reduced, thereby allowing the ratio of the internal diameter to external diameter of the carbide roll to be increased beyond those ratios which would be required by the prior art devices just described.

Figure 3:
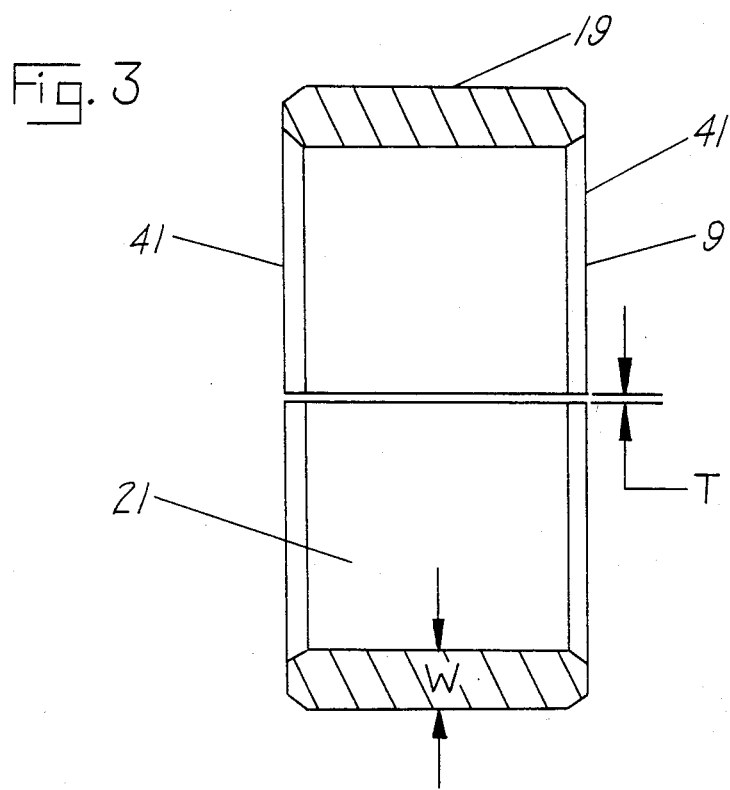
FIG. 3 is a diametric cross section of the split ring according to the present invention.

FIG. 3 shows a split ring member 9 according to the present invention. It has axially facing end surfaces 41 which are joined together by an internal circumferential surface 21 and an external circumferential surface 19. The split ring member 9 has a split communicating between the external circumferential surface 19 and the internal circumferential surface 21 and extending the length of the ring member 9. The split thickness T is preferably as thin as possible in order to minimize the area on the internal bore 17 of the roll 5 which is not radially supported. The wall thickness W of the ring member 9 is preferably uniform.

The external circumferential surface 19 preferably has a rougher finish than the internal circumferential surface 21 and the surface of the internal bore 17 of the roll in order to provide a greater coefficient of friction between the roll bore 17 and the external circumferential surface of the ring 19 thereby aiding in holding the roll 5 nonrotational with respect to the split ring 9.

The surface roughness of the external circumferential surface should preferably have a surface finish of approximately $125\mu$ inches and the internal circumferential surface 21 should preferably have a surface finish of approximately $32\mu$ inches.

The split ring 9 is preferably composed of a metallic material which has a Rockwell C hardness of approximately 40 to 45. It has been found that an AISI 4140 steel having the above-mentioned hardness is adequate for this application.

Figure 4:
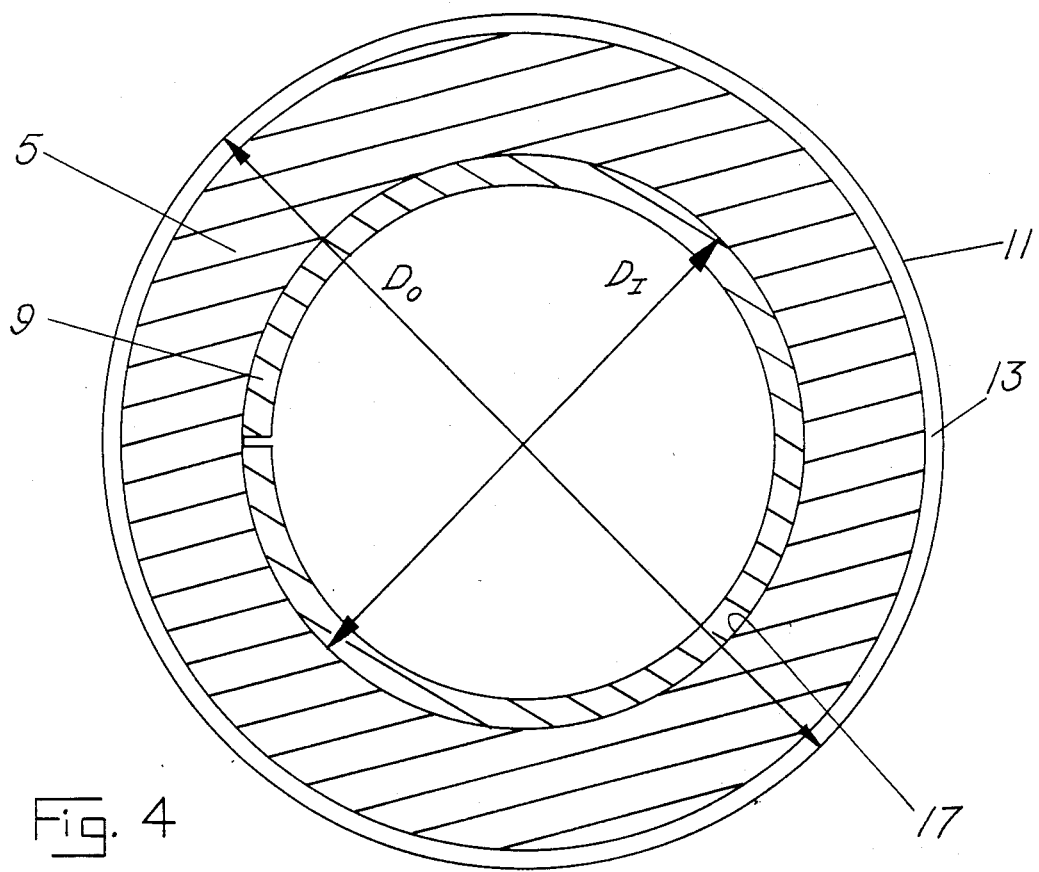
FIG. 4 is a transverse cross section of a roll according to the present invention surrounding a split ring according to the present invention.

Shown in FIG. 4 is a cemented carbide roll 5 having a split ring member 9 slidably engaged in the internal bore 17 of the roll 5. The work surface 11 has a groove 13. The inside diameter of the roll 5, $D_I$, is from sixty-two (62%) percent to seventy-two (72%) percent of the outside diameter $D_O$ of a new roll 5 and is preferably approximately sixty-five (65%) percent. This ratio of $D_I$ to $D_O$ is larger than typically used for new cemented carbide rolls mounted on a tapered arbor by a wedge without a split ring member.

Cemented carbide rod rolls mounted according to this invention on a tapered arbor are held substantially nonrotationally with respect to the arbor. It was found that after sixteen hours of continuous use there was only 5 degrees of relative rotation between the roll and the arbor. It is believed that this small amount of relative rotation is the sum of smaller incremental movements which may have occurred during peak loading of the roll each time the leading edge of a rod first hits the roll. This small amount of relative rotation had no adverse affect on roll lifetime.

Modifications may be made within the scope of the appended claims.

What is claimed is:

1. A rolling mill roll assembly comprising: a tapered arbor; a hollow cylindrical wedge means having a tapered wall thickness; a split ring member having an external circumferential surface, an internal circumferential surface, an axial length and a split running the axial length of said member and communicating between said external and an internal surfaces; a cylindrical cemented carbide roll having a working surface and an internal bore; said wedge means wedged onto said tapered arbor and inside said split ring; said split ring expanded by said wedge means and in pressurized abutment with said internal bore of said roll so as to hold said roll substantially nonrotational; and means for holding said roll, split ring and wedge means fixed along the axis of said tapered arbor.

2. A rolling mill roll assembly according to claim 1 wherein said split ring has a smoother surface finish on said internal circumferential surface than on said external circumferential surface.

3. A rolling mill roll assembly according to claim 2 wherein said external circumferential surface finish of said split ring is rougher than said internal bore of said cemented carbide roll.

4. A rolling mill roll assembly according to claims 1, 2 or 3 wherein said split ring comprises metallic material having a Rockwell "C" hardness of approximately 40 to 45.

5. A split ring member for use in mounting a cemented carbide rod roll body having an internal bore onto a rolling mill arbor having a cylindrical wedge means to apply radial pressure so as to hold said roll body substantially nonrotational on said arbor, said split ring member comprising: a generally flangeless cylindrical and expansible metallic body having an uniform external circumferential surface, an internal circumferential surface, and having a split running the length of said body and communicating between said external and internal surfaces; said external and internal circumferential surfaces being substantially parallel when viewed in axial cross section; said ring member having an outside diameter which, when relaxed, is dimensioned to provide sliding engagement between said external circumferential surface and said bore of said roll body; said ring member having an internal diameter which is dimensioned so as to engage said wedge means and cause said ring member to expand when so engaged; and said outside diameter when expanded produces an interference fit with said roll body bore.

6. A rolling mill roll assembly comprising: a tapered arbor; a hollow cylindrical wedge means having a tapered wall thickness; a split ring member having an external circumferential surface, an internal circumferential surface, an axial length and a split running the axial length of said member and communicating between said external and an internal surfaces; a cylindrical cemented carbide roll having a working surface, an internal bore and an axial length with the respective axial lengths of said carbide roll and said split ring substantially equal; said wedge means wedged onto said tapered arbor and inside said split ring; said split ring expanded by said wedge means and in pressurized abutment with said internal bore of said roll so as to hold said roll substantially nonrotational; and means for holding said roll, split ring and wedge means fixed along the axis of said tapered arbor.

7. A rolling mill assembly according to claim 6 wherein said carbide roll has a pair of parallel axial faces wherein each of said axial faces has a uniform surface appearance.

8. A method of assembling a rolling mill roll assembly wherein the rolling mill roll assembly comprises a carbide roll body having an internal bore, a split ring member, a wedge member and a tapered arbor, the method comprising: slidably engaging the split ring member with the internal bore of the roll body; concentrically mounting the split ring member and roll body onto the wedge member to form a subassembly; concentrically mounting the split ring member, roll body and wedge member subassembly onto the tapered arbor; applying pressure to the wedge member so as to initiate a wedging force; expanding the split ring member by application of the wedging force so that the split ring member is now in pressurized abutment with the internal bore of the roll body, thereby making said roll body substantially nonrotational.

* * * * *